United States Patent [19]

Ricker

[11] Patent Number: 5,451,107
[45] Date of Patent: Sep. 19, 1995

[54] LEAF AND DEBRIS YARD TRANSPORT

[76] Inventor: Melvin E. Ricker, 12900 Co. Rd. E., Wauseon, Ohio 43567

[21] Appl. No.: 188,692

[22] Filed: Jan. 31, 1994

[51] Int. Cl.6 .......................................... B65D 33/08
[52] U.S. Cl. ......................................... 383/10; 383/4; 383/34
[58] Field of Search ................................ 383/4, 34, 10

[56] References Cited

U.S. PATENT DOCUMENTS

| | | | |
|---|---|---|---|
| 530,599 | 12/1894 | Von Oheimb | 383/34 X |
| 2,749,695 | 6/1956 | Hoopingarner | 383/4 X |
| 2,952,381 | 9/1960 | Rosner | 383/2 X |
| 4,200,127 | 4/1980 | Dunleavy | 383/4 X |
| 4,434,829 | 3/1984 | Barnard | 383/34 |
| 4,561,480 | 12/1985 | Underwood et al. | 383/4 X |
| 4,996,727 | 3/1991 | Wyatt | 383/34 X |

*Primary Examiner*—Jes F. Pascua

[57] ABSTRACT

A leaf and debris yard transport for holding and transporting leaves and debris from yards comprising a mouth having a generally concave left member and a generally concave right member, each member further having two free ends; a pair of hinges, each hinge coupled to a free end of the left member and a free end of the right member with the pair creating a pivotal axis therebetween for rotation of the members thereabout; and a container further having a flexible body with a space therein for holding items and an opening coupled about the periphery of the mouth for allowing access to the space, whereby reciprocating the members away from each other about the pivotal axis causes the mouth to open, thus allowing access to the space, and reciprocating the members toward each other about the pivotal axis causes the mouth to close, thus preventing access to the space.

1 Claim, 3 Drawing Sheets

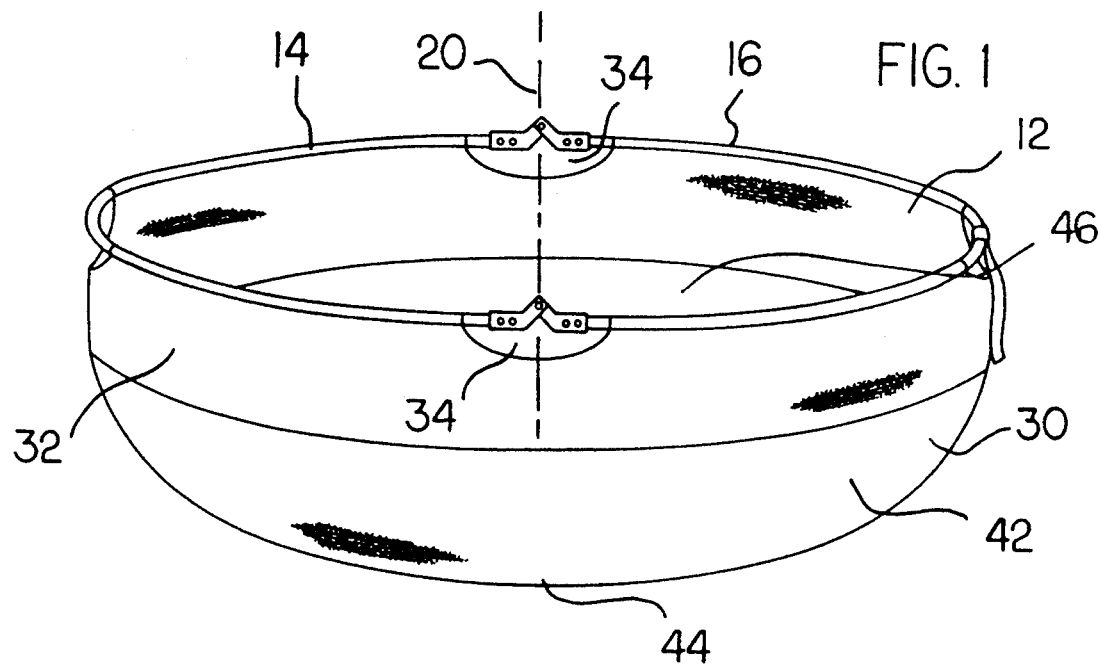
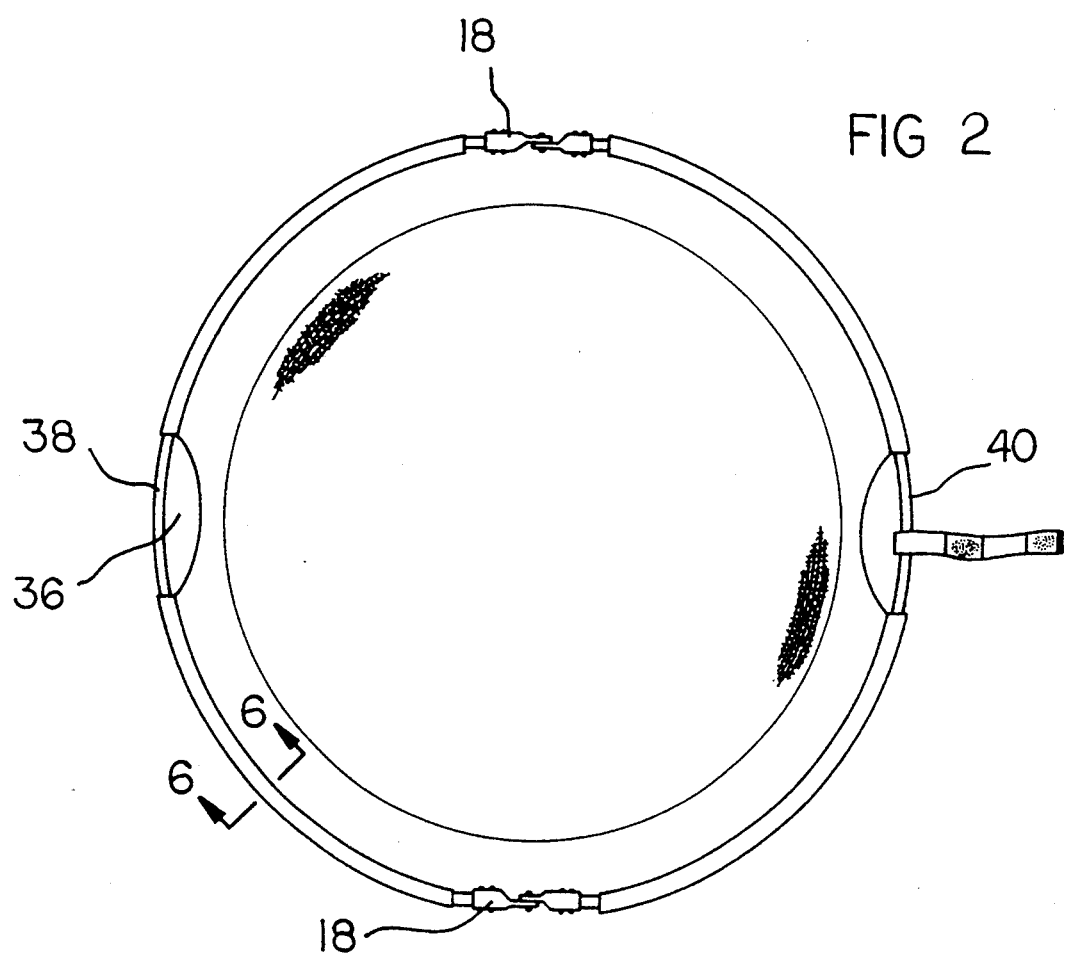

LEAF AND DEBRIS YARD TRANSPORT

BACKGROUND OF THE INVENTION

1. Field of the Invention

The present invention relates to a leaf and debris yard transport and more particularly pertains a leaf and debris yard transport for holding and transporting leaves and debris from yards.

2. Description of the Prior Art

The use of containers is known in the prior art. More specifically, containers heretofore devised and utilized for the purpose of holding and transporting items such as leaves and debris are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,469,762 discloses a transportable leaf collector, U.S. Pat. No. 4,434,829 to Barnard discloses a collapsible yard pan, U.S. Pat. No. 4,561,480 to Underwood discloses a leaf caddy, U.S. Pat. No. 4,693,504 to Baker discloses a pick-up device for lawn debris.

Another patent that contains components generally related to the invention is U.S. Pat. 3,332,166 to Alexander which discloses a toy hoop having a movable weight member.

While these devices fulfill their respective, particular objective and requirements, the aforementioned patents do not describe a leaf and debris yard transport for transporting leaves and other debris that is simple in design, lightweight in construction, and features a concave mouth for providing easy access for loading and unloading.

In this respect, the leaf and debris yard transport according to the present invention substantially departs from the conventional concepts and designs of the prior art, and in doing so provides an apparatus primarily developed for the purpose of holding and transporting leaves and debris from yards.

Therefore, it can be appreciated that there exists a continuing need for a new and improved leaf and debris yard transport which can be used for holding and transporting leaves and debris from yards. In this regard, the present invention substantially fulfills this need.

SUMMARY OF THE INVENTION

In the view of the foregoing disadvantages inherent in the known types of containers now present in the prior art, the present invention provides an improved leaf and debris yard transport. As such, the general purpose of the present invention, which will be described subsequently in greater detail, is to provide a new and improved leaf and debris yard transport and method which has all the advantages of the prior art and none of the disadvantages.

To attain this, the present invention essentially comprises a mouth having a generally semicircular and tubular left member and a generally semicircular and tubular right member, each member further having two free ends; a pair of hinges, each hinge coupled to a free end of the left member and a free end of the right member such that the pair is diametrically opposed and define a pivotal axis therebetween for rotation of the members thereabout; a container further comprising an elongated swatch of heavyweight and flexible material coupled about the periphery of the mouth to form an upper sidewall having an upper extent and a lower extent, the upper extent of the sidewall having a first and a second pair of cutouts disposed thereon, the first pair each having a cutout disposed adjacent to each hinge on the periphery of the mouth to enable unobstructed movement of the members about the pivotal axis, the second pair each having a cutout disposed on the periphery of the mouth such that the pair is diametrically opposed about the pivotal axis to define a left handle and a right handle for lifting and transporting the container; and a concave swatch of lightweight and flexible material coupled to the lower extent of the upper sidewall to define a lower sidewall and integral bottom, the sidewalls and bottom creating a space therebetween for holding items, whereby reciprocating the handles away from each other about the pivotal axis causes the mouth to open, thus allowing access to the space, and reciprocating the handles toward each other about the pivotal axis causes the mouth to close, thus preventing access to the space; and an elongated strap having a first end coupled to a handle, a second free end having a pile type fastener coupled thereto, and an intermediate portion therebetween having a complimentary pile type fastener coupled thereto for coupling with the second end to secure the handles together and prevent inadvertent spillage of contents from the space.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved leaf and debris yard transport which has all the advantages of the prior art containers and none of the disadvantages.

It is another object of the present invention to provide a new and improved leaf and debris yard transport which may be easily and efficiently manufactured and marketed.

It is a further object of the present invention to provide a new and improved leaf and debris yard transport which is of durable and reliable construction.

An even further object of the present invention is to provide a new and improved leaf and debris yard transport which is susceptible of a low cost of manufacture with regard to both materials and labor, and which accordingly is then susceptible of low prices of sale to the consuming public, thereby making such a leaf and debris yard transport economically available to the buying public.

Still yet another object of the present invention is to provide a new and improved leaf and debris yard transport which provides in the apparatuses and methods of the prior art some of the advantages thereof, while simultaneously overcoming some of the disadvantages normally associated therewith.

Even still another object of the present invention is to provide a new and improved leaf and debris yard transport for holding and transporting leaves and debris from yards.

Even still another object of the present invention is to provide a new and improved leaf and debris yard transport that is simple in design, lightweight in construction, and features a concave mouth providing easy access for loading and unloading.

Even still another object of the present invention is to provide a new and improved leaf and debris yard transport whose mouth may be sealed and opened through reciprocation of integral handles formed thereon.

Even still another object of the present invention is to provide a new and improved leaf and debris yard transport that can be placed in a collapsible stowed configuration while using a minimum amount of space.

Even still another object of the present invention is to provide a new and improved leaf and debris yard transport that may be easily carried via handles from one place to another.

Lastly, it is an object of the present invention is to provide a new and improved leaf and debris yard transport comprising a mouth having a generally concave left member and a generally concave right member, each member further having two free ends; a pair of hinges, each hinge coupled to a free end of the left member and a free end of the right member with the pair creating a pivotal axis therebetween for rotation of the members thereabout; and a container coupled about the periphery of the mouth further having a flexible body with a space therein for holding items and an opening for allowing access to the space, whereby reciprocating the members away from each other about the pivotal axis causes the mouth to open, thus allowing access to the space, and reciprocating the members toward each other about the pivotal axis causes the mouth to close, thus preventing access to the space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the leaf and debris yard transport constructed in accordance with the principles of the present invention.

FIG. 2 is a plan view of the preferred embodiment of the present invention.

The same reference numerals refer to the same parts through the various Figures.

DESCRIPTION OF THE PREFERRED EMBODIMENT

Figure 3:
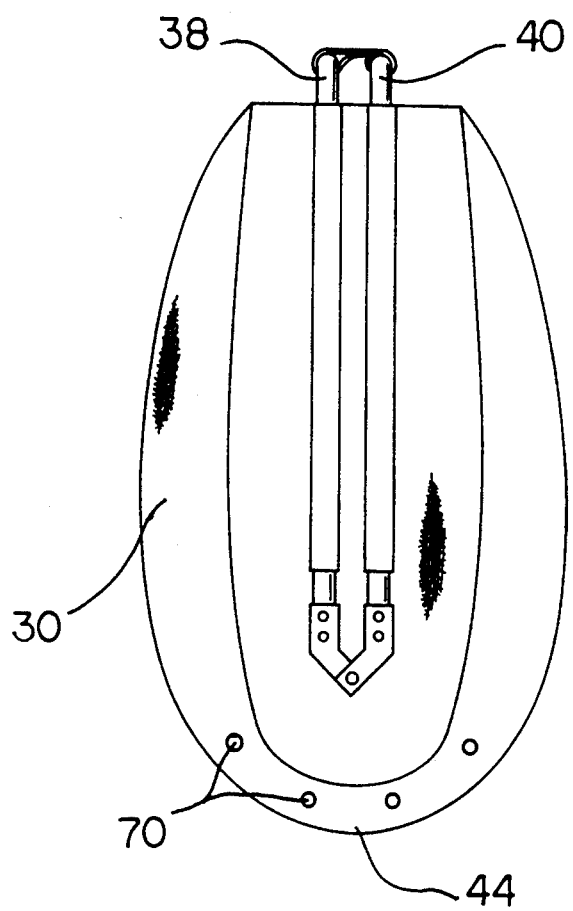
FIG. 3 is a view of the preferred embodiment of the present invention with the mouth in a closed position.
Figure 4:
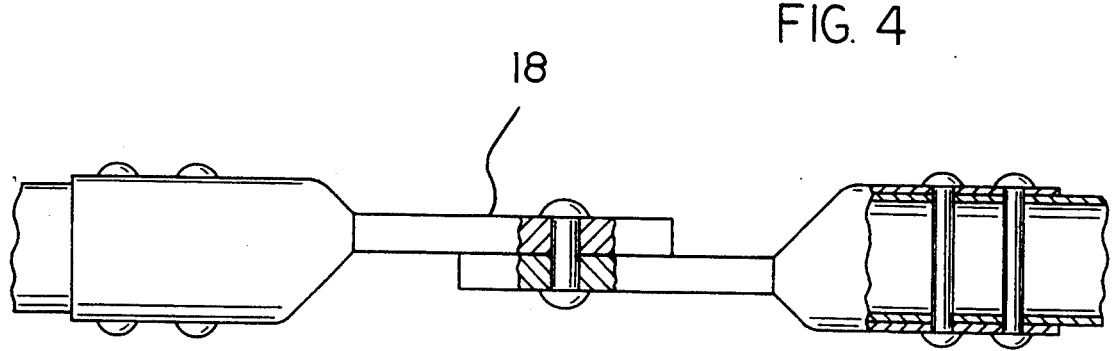
FIG. 4 is a close-up view of a hinge of the present invention.
Figure 5:
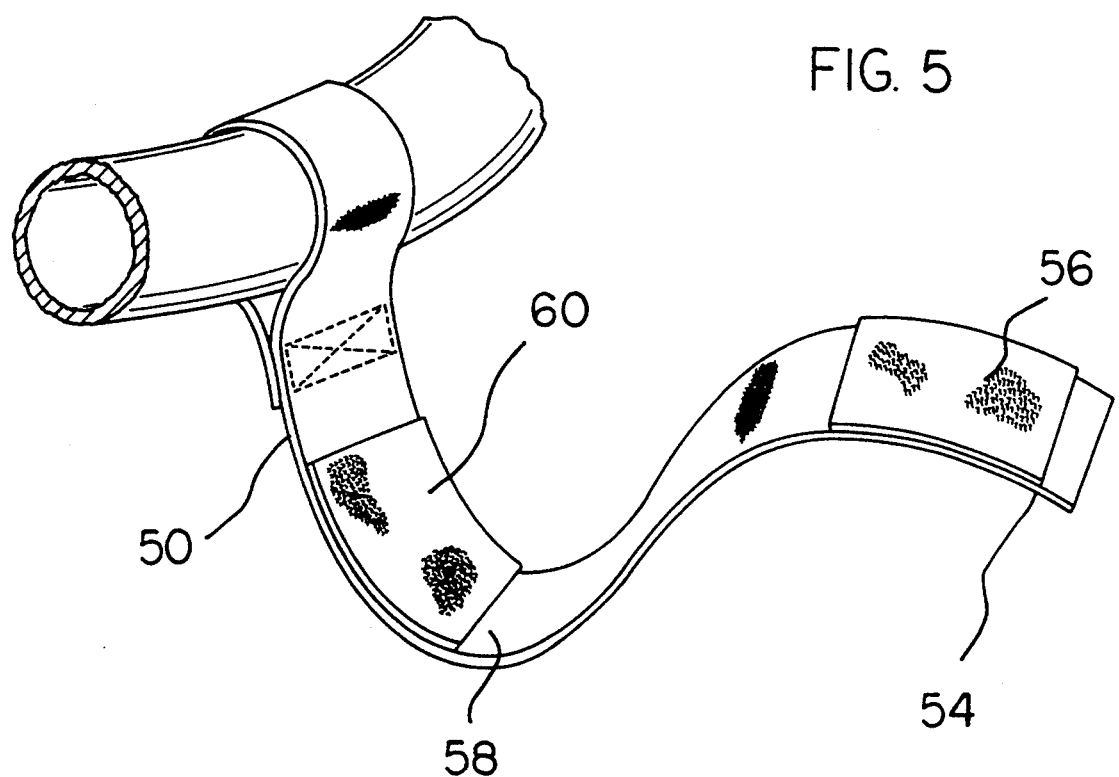
FIG. 5 is a view of the strap used to secure the mouth of the device in a closed configuration.
Figure 6:
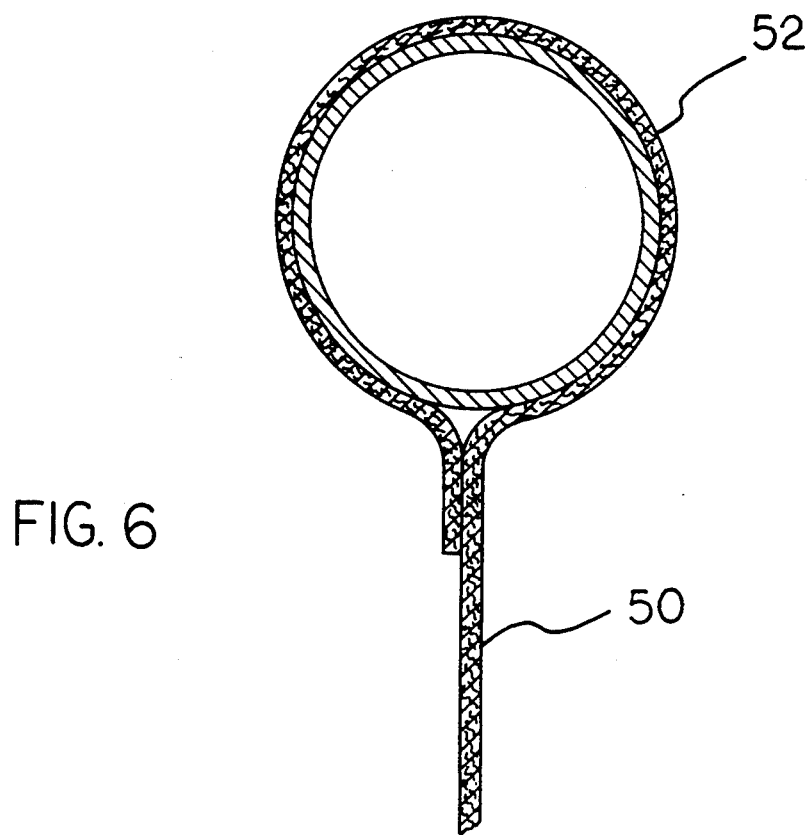
FIG. 6 is a view of the handle of the present invention taken along the line 6—6 of FIG. 2.

With reference now to the drawings, and in particular, to FIG. 1 thereof, the preferred embodiment of the new and improved leaf and debris yard transport embodying the principles and concepts of the present invention and generally designated by the reference number 10 will be described.

Specifically, the present invention includes three major components. The major components are the mouth, the container, and the strap. These components are interrelated to provide the intended function.

More specifically, it will be noted in the various Figures that the first major component is the mouth 12. The mouth has several subcomponents. The first and second subcomponents comprise a left member 14 and a right member 16. The left member and the right member are generally semicircular and tubular in shape. Both the left member and the right member have two free ends. The third subcomponent of the mouth comprises a pair of hinges 18. Each hinge is coupled to a free end of the left member and a free end of the right member. By coupling the hinges in this fashion, the pair is thus diametrically opposed with a pivotal axis 20 defined centrally therebetween for rotation of the members thereabout.

The second major component is a container 30. The container has several subcomponents. The first subcomponent comprises an elongated swatch of heavyweight and flexible material coupled about the periphery of the mouth. The swatch forms an upper sidewall 32 having an upper extent and a lower extent. The upper extent of the sidewall has a first pair 34 and a second pair 36 of cutouts disposed thereon.

Each cutout of the first pair is disposed adjacent to each hinge 18 on the periphery of the mouth. These cutouts are positioned in this fashion to enable unobstructed movement of the members about the pivotal axis 20. Each cutout from the second pair is disposed on the periphery of the mouth. The pair is positioned such that it is diametrically opposed about the pivotal axis.

These cutouts define a left handle 38 and a right handle 40 for lifting and transporting the container.

The next subcomponent of the container is a concave swatch of lightweight and flexible material coupled to the lower extent of the upper sidewall. This swatch defines a lower sidewall 42 with an integral bottom 44. The sidewalls and bottom act in combination to create a space 46 therebetween for holding items such as leaves and debris.

Operation of the device is performed through reciprocal action of the handles 38, 40. Reciprocating the handles away from each other about the pivotal axis 20 causes the mouth 12 to open. This allows access to the space for loading or unloading leaves and debris. Reciprocating the handles toward each other about the pivotal axis causes the mouth to close. This prevents access to the space and holds the contents therein.

The third major component is an elongated strap 50. The strap has a first end 52 coupled to one of the handles. The strap has a second free end 54. The second free end has a pile type fastener 56 coupled thereto. The intermediate portion 58 of the strap located between the first and second ends has a complimentary pile type fastener 60 coupled thereto. This complimentary pile type fastener is used for coupling with the pile type fastener on the second end, thus securing the handles together in a closed configuration. Securing the handles together prevents inadvertent spillage of contents from the space of the container.

A second embodiment of the present invention is shown in FIG. 3 and includes substantially all of the components of the present invention further including a plurality of holes 70 disposed on the container near the sides and the bottom 44. The holes are positioned to allow drainage of wet items therein such as wet leaves. Keeping the container drained in this fashion prevents mold and mildew from building within the container, whereby helping to extend the life of the swatches.

In the preferred embodiment of the invention, the container is made of canvas. The members of the mouth are comprised of one-half inch aluminum metal. The straps used for securing the handles in a closed configuration are made of velcro. The container can be formed with a six foot diameter for performing large transport functions or sized with a four foot diameter for performing smaller transport functions.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A leaf and debris yard transport for holding and transporting leaves and debris from yards comprising, in combination:

a mouth comprising a generally semicircular and tubular left member and a generally semicircular and tubular right member, each member having two free ends, and a pair of hinges, each hinge coupled to a free end of the left member and a free end of the right member such that the pair is diametrically opposed and define a pivotal axis therebetween for rotation of the members thereabout;

a container further comprising an elongated swatch of heavyweight and flexible material coupled about the periphery of the mouth to form an upper sidewall having an upper extent and a lower extent, the upper extent of the sidewall having a first and a second pair of cutouts disposed thereon, the first pair each having a cutout disposed adjacent to each hinge on the periphery of the mouth to enable unobstructed movement of the members about the pivotal axis, the second pair each having a cutout disposed on the periphery of the mouth such that the pair is diametrically opposed about the pivotal axis and defines a left handle and a right handle for lifting and transporting the container; and a concave swatch of lightweight and flexible material coupled to the lower extent of the upper sidewall to define a lower sidewall and integral bottom, the sidewalls and bottom creating a space therebetween for holding items, whereby reciprocating the handles away from each other about the pivotal axis causes the mouth to open, thus allowing access to the space, and reciprocating the handles toward each other about the pivotal axis causes the mouth to close, thus preventing access to the space; and an elongated strap having a first end coupled to a handle, a second free end having a pile type fastener coupled thereto, and an intermediate portion therebetween having a complimentary pile type fastener coupled thereto for coupling with the second end to secure the handles together and prevent inadvertent spillage of contents from the space.

* * * * *